A. L. MOSELEY.
PORTABLE AUTOMOBILE GROCERY STORE.
APPLICATION FILED DEC. 31, 1920.

1,425,789.

Patented Aug. 15, 1922.
6 SHEETS—SHEET 1.

Inventor
Annie L. Moseley
By Watson E. Coleman
Attorney

A. L. MOSELEY.
PORTABLE AUTOMOBILE GROCERY STORE.
APPLICATION FILED DEC. 31, 1920.

1,425,789.

Patented Aug. 15, 1922.
6 SHEETS—SHEET 2.

Inventor
Annie L. Moseley
By Watson E. Coleman
Attorney

A. L. MOSELEY.
PORTABLE AUTOMOBILE GROCERY STORE.
APPLICATION FILED DEC. 31, 1920.

1,425,789.

Patented Aug. 15, 1922.
6 SHEETS—SHEET 4.

Inventor
Annie L. Moseley
By Watson E. Coleman
Attorney

UNITED STATES PATENT OFFICE.

ANNIE L. MOSELEY, OF SAN ANTONIO, TEXAS.

PORTABLE AUTOMOBILE GROCERY STORE.

1,425,789.

Specification of Letters Patent. Patented Aug. 15, 1922.

Application filed December 31, 1920. Serial No. 434,358.

*To all whom it may concern:*

Be it known that I, ANNIE LAURIE MOSELEY, a citizen of the United States, residing at San Antonio, in the county of Bexar and State of Texas, have invented certain new and useful Improvements in Portable Automobile Grocery Stores, of which the following is a specification, reference being had to the accompanying drawings.

The foregoing invention has for its purpose to provide a portable grocery store particularly of a self-serving character for the purpose of facilitating the serving of customers.

Heretofore only one customer at a time could be served by the salesman, and others trying to purchase various articles necessarily have to wait their turn, and very often they have to wait outside, not only on account of lack of space, but also to avoid the necessity of the salesman keeping a close watch over the stock, and the customers who may enter. It has been found that this method requires much time, and considerable work on the part of the salesman in supplying the customers. Also in the device disclosed in this patent a great many articles necessary to the housewife or housekeeper are necessarily omitted, for the reason that it has been found impossible for the customer to serve one's self.

There are other serious handicaps in using the portable automobile grocery store of the aforesaid patent, in that where canned goods are supported on the wire shelvings, the goods must necessarily be laid down, piled or mixed together, therefore if the portable grocery store in this patent should be used as a store, wherein the customer may serve one's self, the customer loses considerable time in an effort to find what is needed, on account of the general mix up of the stock, which cannot be replaced by the customer or the salesman accurately without loss of much time and labor. This mixing up of the articles is not only due to the customer, but also due to the vibration of the body of the car when traveling. Also in using the plan of shelving in the said patent, the articles or goods must be placed orderly on the shelves, in order to enable the salesman to find what the customer desires, or to determine the class of goods on hand, and the class of goods to be renewed. Furthermore due to the articles or goods being jostled and mixed up due to the motion of the truck or vehicle, it is difficult to determine, what is not in stock without the loss of considerable time, as well as the loss of business, because the customer becomes impatient, and does not depend upon a complete service.

As another purpose the invention aims to provide an improved self-serving portable store of the grocery character, the result of which all customers are self-served, and as all customers are compelled to pass the salesman's counter on their way through the exit passage the salesman is, at all times, sure of receiving pay for all articles purchased. Furthermore the portable grocery store in the present case and the method of using the same avoids an overstock of certain classes of goods, as well as avoiding the elimination of other and important articles.

A further purpose of the portable grocery store in the present case, the store body or housing (which is wheel supported) includes a door for the entrance opening, and while this door can be opened from the exterior, it automatically closes by the use of a door check, and it cannot be open from the interior. By this means the customer is constrained to pass down one side of the customer's isle, serving one's self, then to the rear of the body or housing, and then continue up the other side of the aisle, necessarily passing the cash register and the counter in front of the salesman, and then pass out through the exit opening, which cannot be opened from the exterior. By this method payment for all purchases or articles is assured, while in the automobile grocery store of the aforesaid patent the customer passes out through the entrance door, which not only results in a congestion of the customers at the door and in the passages, but also renders it practically impossible to determine who has and who has not been served, as well as who has and who has not paid for the articles purchased. With the form of portable store as in the present case the possibility of theft is avoided.

A still further purpose resides in the provision of means for holding small items or articles easily concealed in cases or on shelves or drawers in close position to the salesman's counter, where they can be closely watched, and where they can be sold conveniently to the customer. For instance the various notions, such as thread, needless and the like articles are so easily taken, without being noticed, hence the provision of means for containing them in position close to the salesman.

Also in the present invention a counter refrigerator and candy case are in close proximity, and are disposed in position close to the salesman, so that such items, as meat, candies, etc. can be served to the public, and were it not for this position, such items in much demand would be purchased elsewhere.

Additionally the invention aims to provide shelving of such a character, that the various goods or articles, either in cans or packages or otherwise cannot be jostled about or mixed up due to the vibration of the body of the truck or vehicle, thereby enabling the customer to easily locate the articles desired, and owing to the articles diminishing in an orderly character, other articles or items can be easily and orderly replaced by the salesman. In fact owing to the arrangement of the shelving and the means for preventing jostling or mixing up of the various articles this will permit any one of ordinary intelligence to restock the shelves accurately.

Also the invention provides shelving with partitions, and means such as grooves in the top bottom boards, for the reception of partitions, used in dividing the different brands or classes of goods. By this construction, it is possible to prevent the different brands and classes of goods or articles from mixing together, as the stocks begin to diminish.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 9 is a view in elevation of the opposite outer wall of the aisle leading from the entrance opening, showing the shelvings or compartments for various articles, wherein certain partitions may be arranged, to keep different brands or goods or articles separate, and from being jostled or mixed together.

Figure 10 is a detail view of the shelvings shown in Figure 9, illustrating the means for holding the partitions in place.

Figure 22 is a detail view of the mop or broom rack.

Figure 1:
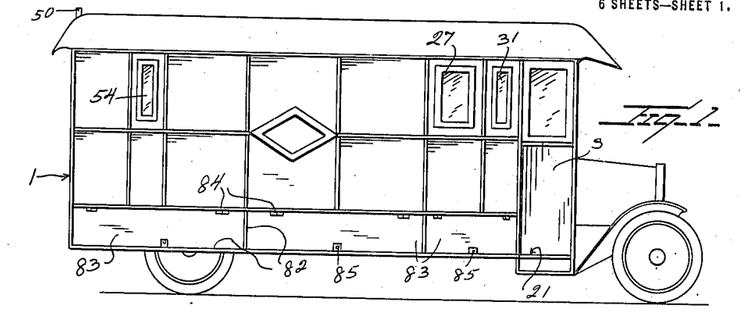
Figure 1 is a view in side elevation of the improved portable automobile grocery store constructed in accordance with the invention, showing clearly the compartments under the body of the vehicle or truck.
Figure 2:
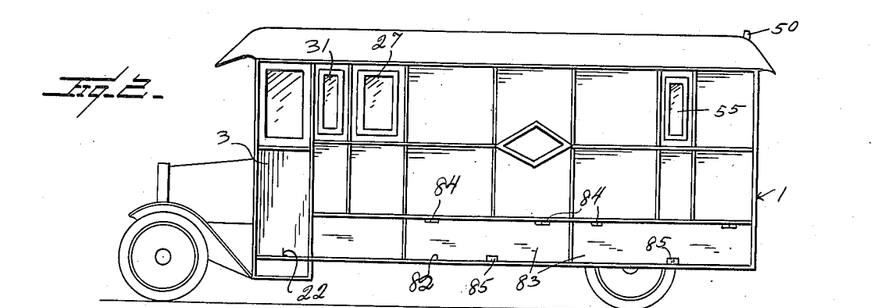
Figure 2 is a view in elevation of the opposite side of the truck, also showing compartments under the body thereof.
Figure 3:
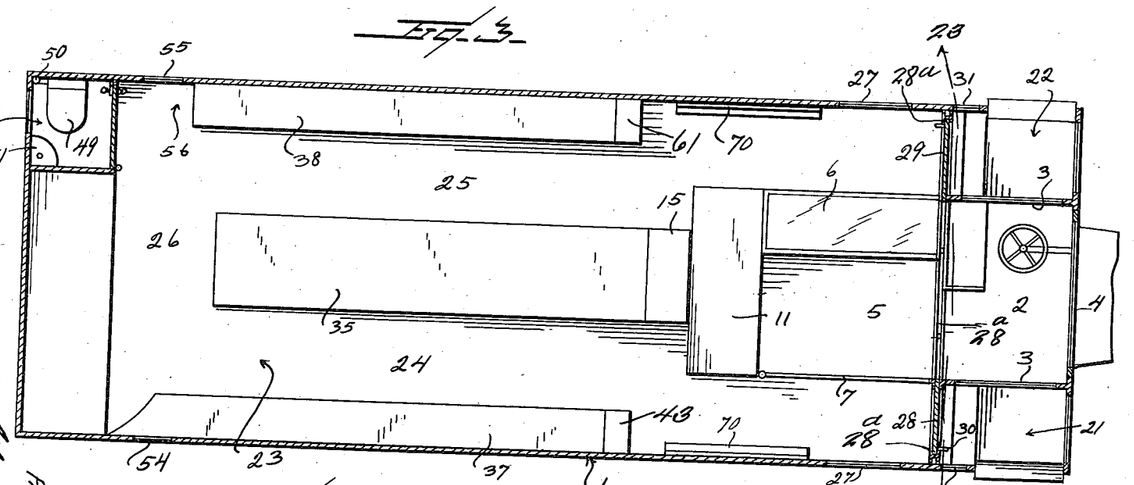
Figure 3 is a sectional plan view through the body of the store or truck showing the arrangement of the various shelvings and the disposition of the aisles, as well as the entrance and exit openings.
Figures 11, 12, 13, 14, 23, 24:
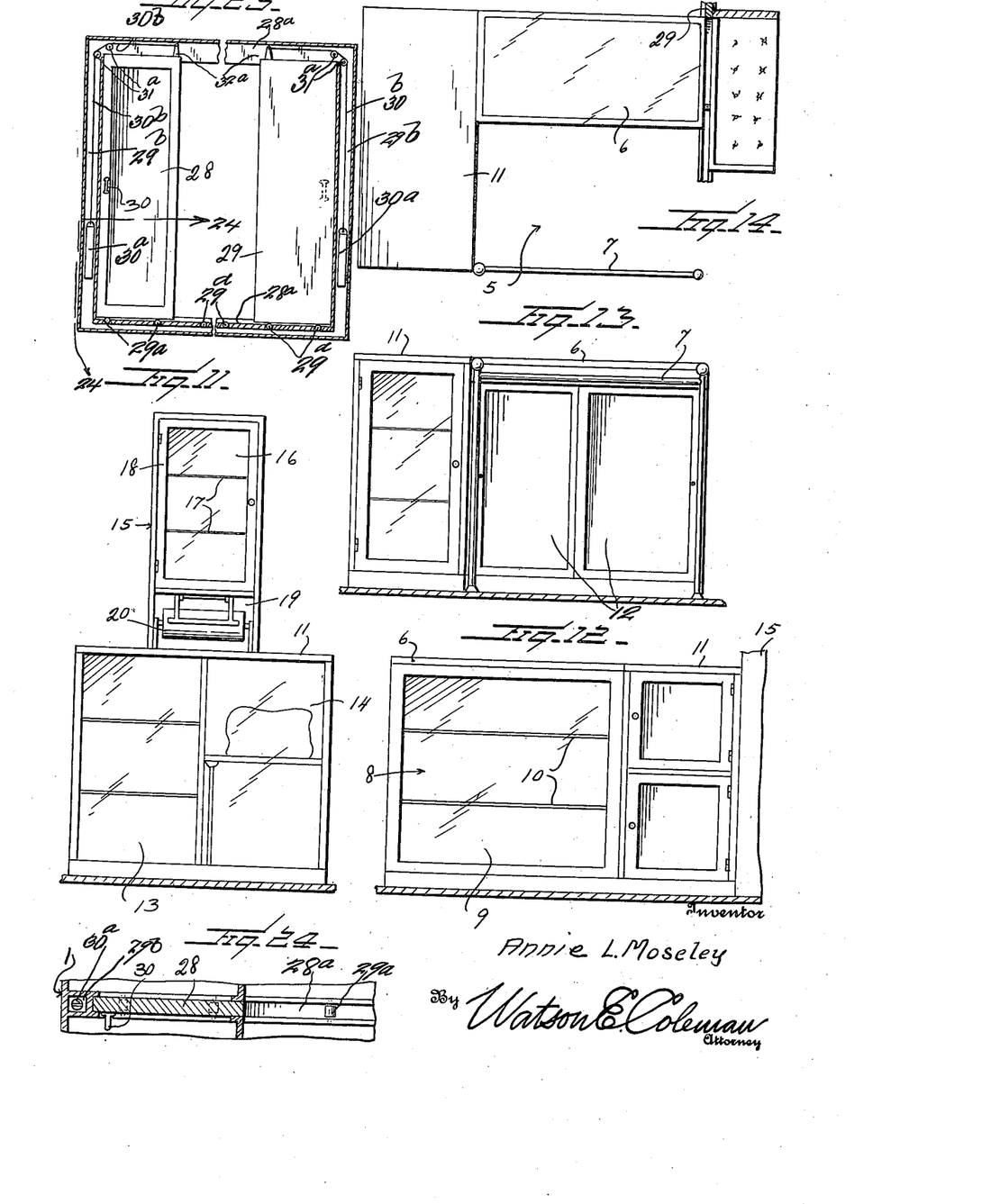
Figure 12 is a side elevation of the outer portion of a part of the refrigerator counter.
Figure 13 is a view in elevation of the partition between the salesman's aisle and the customer's aisle.
Figure 14 is an enlarged detail sectional plan view of the salesman's aisle and the compartments under the refrigerator counters.
Figure 23 is a sectional view on line 23—23 of Figure 3.
Figure 24 is an enlarged detail sectional view on line 24—24 of Figure 23.
Figure 15:
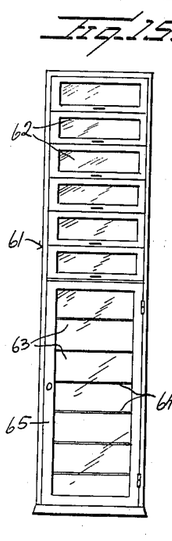
Figure 15 is an enlarged view in elevation of the notion case.

Referring more especially to the drawings, particularly Figure 3, 1 designates the housing or body of the automobile or truck, which may be any suitable shape or configuration, preferably of rectangular contour, and the forward part of this body or housing has a compartment 2 under the driver's seat and the entire instrument board (not shown). This compartment 2 has the side walls 3 and the forward windshield glass 4. This compartment communicates with the salesman's compartment 5. It is to be noted that the driver or chauffeur also acts as the salesman, and vice versa, though it is obvious that there may be an assistant. In order to afford the salesman's aisle a glass top counter 6 and a partition 7 are provided, which are spaced as shown. As clearly disclosed in Figure 12 the counter 6 has a compartment 8 under it, and this compartment is provided with a permanent plate glass closure 9, so that the goods or articles, whatever they may be, may be clearly visible on the wire shelves or supports 10. The opposite side of the compartment 8 has swinging closures 12 to permit the salesman to have access to the compartment. A second counter 11 is arranged at one end of the counter 6, and at right angles thereto. The partition 7 has one face adjacent the customer's entrance aisle. Suitable refrigerator compartments are constructed under the counter 11, there being a storage compartment 13 and an ice chamber 14. The storage compartment obviously is designed for perishable food, such as meats and the like. Mounted adjacent to and offset to the rear of the top of the counter 11 is a frame 15 which has a compartment 16 for candies and the like. This compartment is provided with shelves 17, there being a closure or door 18, in order to prevent access to the interior of the candy compartment by unauthorized persons. It is obvious that this candy case is in close position to the salesman, in order that the customers may be easily and conveniently served. Under the candy compartment is a compartment 19 for a roll of wrapping paper 20, which is convenient to the salesman, for wrapping the various articles which may be purchased by the customer.

The forward part of the body or housing has an entrance passage 21 and an exit passage 22 afforded on the remote sides of the partitions 3, which may or may not have plate glasses.

It is to be noted that the interior of the body or housing is provided with a U-shaped customer's aisle designated as a whole by the number 23. This aisle comprises the two longitudinally extending parallel parts 24 and 25, and the transverse connecting portion 26, which is at the rear of the body or housing. The outer remote walls of the forward parts of the longitudinal parallel passage ways 24 and 25 have windows 27. To close communication between the passage ways 21 and 22 and the forward ends of the longitudinally extending passages 24 are doors or closures 28 and 29. These doors 28 and 29 are of the sliding type, they are mounted in upper and lower guides 28ª. The door 29 when open separates the salesman's aisle 5 and the forward driver's, chauffeur's, or salesman's compartment, where the machine is controlled. The door 29 when open engages directly in the rear of the driver's or automobile seat. When the doors are closed, their automatic latches (not shown) lock, thereby holding the doors closed. The lower edges of the doors operate on rollers 29ª. The sides of the automobile body are provided with channels 29ᵇ for the reception of weights or gravity members 30ª, which are connected to the doors by means of the door cables or cords 30ᵇ, these cables pass over the pulleys 31ª, and are connected to the arms 32ª. The arms 32ª are carried by the doors 28 and 29. The door 28 has its automatic latch of such a design and construction, that when the door closes, the latch automatically latches and holds the door closed, and since there is no handle on the inner surface of the door adjacent the passage 24, it is impossible to open the door from the passage 24.

The door 29 also has a latch (not shown), but automatic, whereby when the door closes, the latch will automatically latch and hold the door in a closed position. As the surface of the door 29 nearest the passage or outlet or exit 22 is plain, and there is no operating handle of any kind or projection on the exterior of the door, it is practically impossible to open the door 29 from the customer's side thereof. Since there is no way of entering the car but through the customer's door 28, and no way to leave, except through the customer's door 29, the driver may be assured of receiving compensation for all purchases. The outer remote walls of the forward end of the housing or body, at points between the entrance and exit passages 21 and 22 and the doors or closures 28 and 29 have windows 31.

Figures 4, 7:
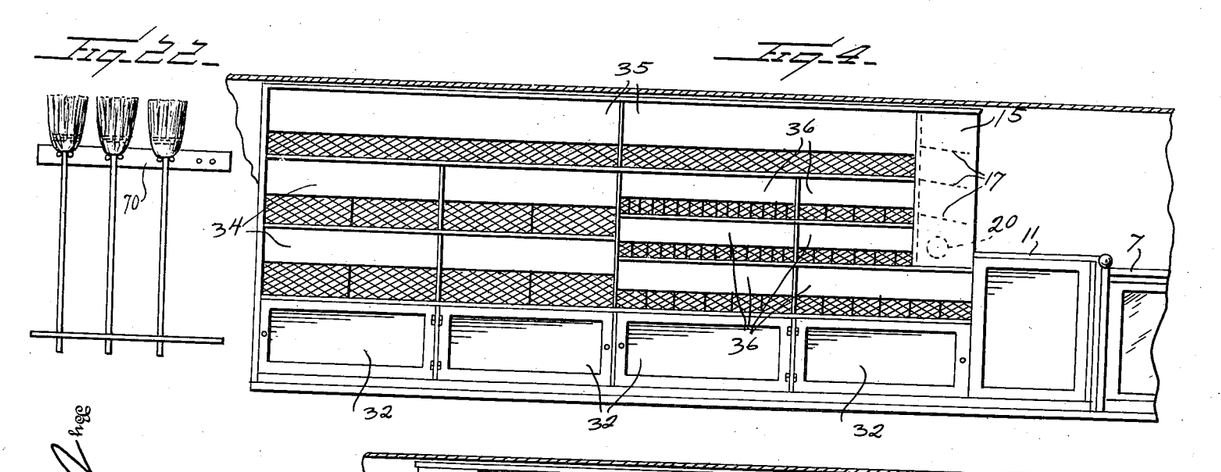
Figure 4 is a view in elevation of the shelvings and compartments on one side of a central partition of the body of the truck.
Figure 7 is a view in elevation of the outer side wall of the back portion of the aisle leading to the exit opening, showing the notion case or compartment, and also showing the drop sash window and space for the heating apparatus.
Figure 5:
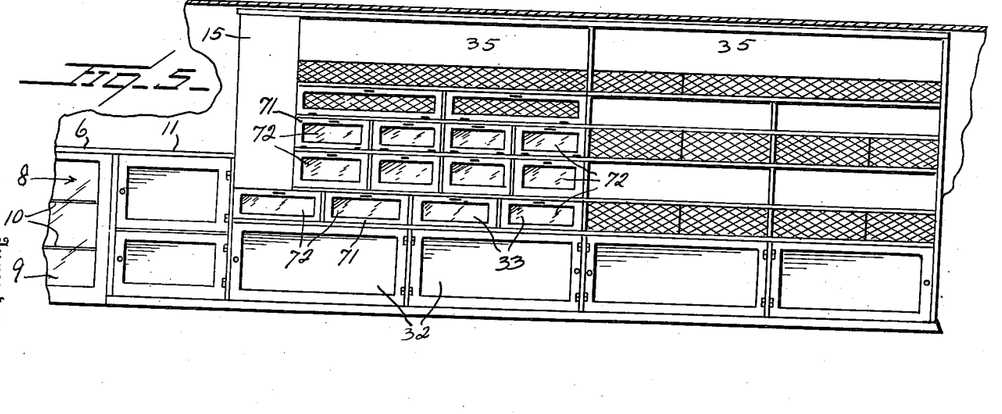
Figure 5 is a view in elevation of the shelvings and compartments on the opposite side of the central partition.
Figure 6:
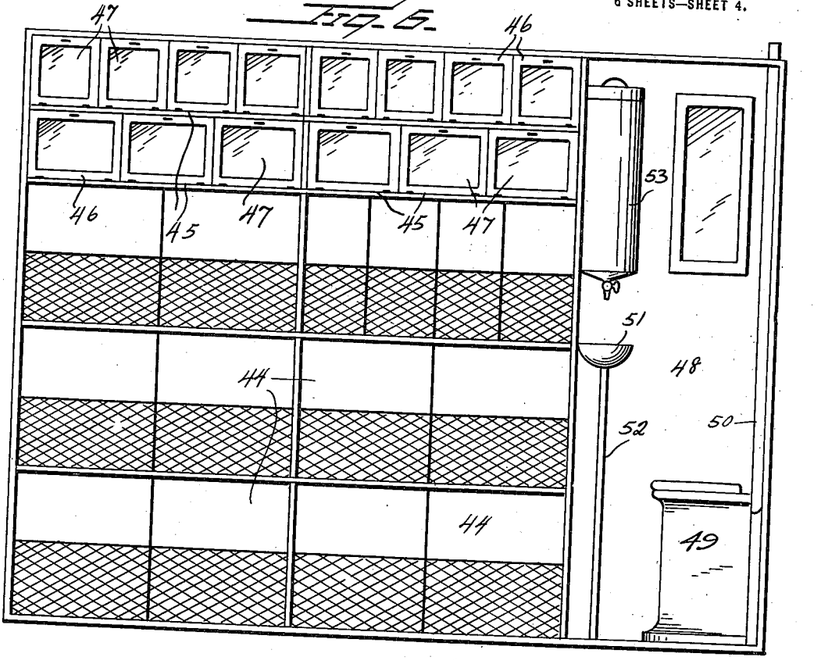
Figure 6 is a view in elevation of the shelvings and compartments and the salesman's toilet at the rear of the body.
Figures 7, 11:
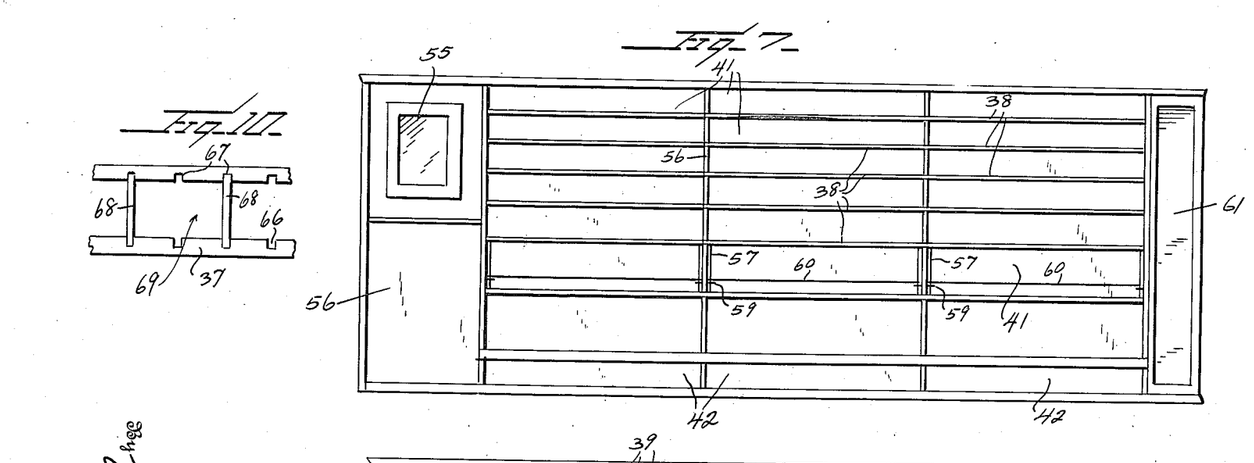
Figure 11 is an enlarged detail view in elevation of a portion of the refrigerator counter, showing the refrigerator and the compartments for food and ice, and illustrating the paper roll and candy case above.
Figure 8:
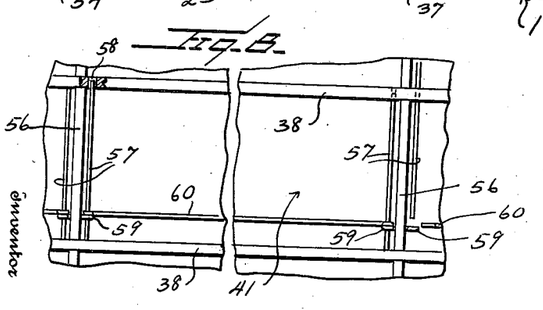
Figure 8 is a detail view of the article retaining rods of certain of the shelves shown in Figure 7.

Extending rearwardly and dividing the aisles 24 and 25 of the U-shaped aisle 23 is a central partition or superimposed shelvings and compartments, for bread, cakes, fruits, cereals, bottle goods and the like, designated respectively 32, 33, 34, 35 and 36, which compartments are shown clearly in Figures 4 and 5. It will be noted that the super-imposed compartments for bread, cakes, fruit, cereals, bottle goods and the like are on opposite sides of the central partition. In fact the various compartments on the right hand side of the aisle 24, as are carried by the central partition, are shown, clearly in Figure 5, while the various super-imposed compartments on the left hand side of the aisle 25 are shown clearly in Figure 4. Also in Figures 4 and 5 the refrigerator elements under the candy case are illustrated.

Figure 16:
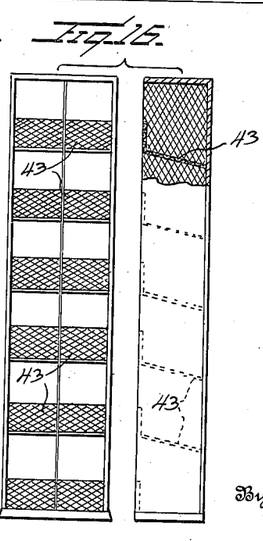
Figure 16 discloses detail views of the wire shelvings for light goods or small cans.

Arranged adjacent the left and right hand remote walls of the aisles 24 and 25 are series of super-imposed shelvings 37 and 38, which form the compartments 39 and 40, and 41 and 42. Adjacent one end of the shelvings on the left hand side of the aisle 24 is a series of super-imposed wire shelvings 43, which are shown clearly in Figure 16. These wire shelvings are designed for light goods, such as small cans of various commodities. The rear wall of the housing or body, namely the rear wall of the customer's aisle is provided with a plurality of super-imposed wire shelvings, and compartments 44 and 45. The compartments 44 are designed to contain vegetables and the like, while the compartments 45 are designed for various package goods, which are disposed on display, there being hinged closures 46 with plate glass coverings 47, whereby the various package goods are visible. At the right hand of this plurality of super-imposed compartments is a salesman's toilet 48. Arranged in the toilet is a conventional form of chemical hopper 49, including a vent pipe 50. Also arranged in the toilet compartment is a basin 51 and drain pipe 52, there being a suitable water tank 53 disposed above the basin, whereby the basin may be supplied with water for washing purposes.

One of the side walls of the customer's aisle, at a point between the shelvings 37, and the rear compartments 44 and 45 is a drop sash window 54. Opposite the window 54 between the shelvings 38 is a drop sash window 55, and a suitable space 56 for a conventional form of heater (not shown), whereby the aisle, or rather the interior of the body may be heated.

The shelvings 38 have suitable partitions 56, thereby affording compartments, for various articles. Certain of the compartments have vertical rods 57 at their ends, which are passed down through openings 58 in certain of the shelvings, and have their lower ends resting upon other of such shelves. Suitable screw eyes 59 are connected to the partitions, for the reception of the vertical rods 57, so as to hold them in perpendicular position. Suitable rods 60 having eyes at their ends are engaged with the vertical rods 57, and are capable of adjustment vertically thereon, for the purpose of removing and placing various articles on the shelves.

Adjacent one end of the super-imposed shelves 38 and compartments 41 is a notion case 61 comprising upper and lower sections 62 and 63. The upper section comprises a plurality of drawers having glass fronts and adapted to contain needles, thread, hair pins, etc., while the lower section 63 is provided with a plurality of shelves 64 for supporting stationery, there being a glass front closure 65 for the purpose of protecting the lower section of the notion case.

Certain of the shelves 37 are provided with grooves 66 and 67, to receive partitions 68, for the purpose of dividing the longitudinal compartments 39 into subcompartments 69. These partitions 68 are not only designed for dividing the longitudinal compartments into subcompartments, but are also used for separating the different classes of goods, in order to prevent them from jostling or mixing together due to the vibration of the body of the portable grocery store. Also by the use of these partitions the various goods can be more readily replenished, in an orderly way, since the goods cannot jostle or mix up. For instance if the subcompartment need a dozen to fifteen or more additional cans or packages of certain goods, in order to fill the compartment, it is very easy to simply place them on the shelves in the proper compartment, not necessitating separating other classes of goods from those to be replenished, thereby facilitating the replenishing of the shelves. The opposite remote walls of the parallel longitudinally extending aisles are provided with combined broom and mop supporting racks 70, the detail view of which is disclosed in Figure 22. Other forms of racks may be substituted.

Figure 17:
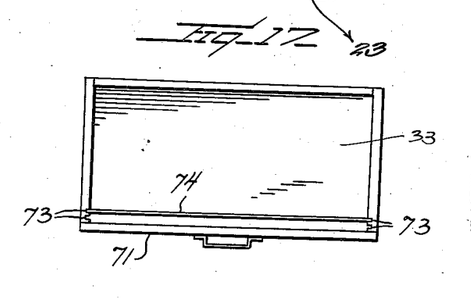
Figure 17 is a detail view of one of the cake drawers, showing the means for holding the false back.

One of the drawers 33 is shown in Figure 17, therefore it will be noted that the drawers have front pieces 71 provided with glass fronts 72, through which cakes and the like are clearly visible to the customers. The end walls of the drawers, as shown clearly in Figure 17 have vertical grooves 73, any two opposite grooves of which are adapted to receive a false back 74, thereby affording a space immediately in the rear of the front piece 71, for the reception of samples of cake and the like to be contained in the compartment to the rear of the back 74. It will be noted that the false backs may be adjusted forwardly and rearwardly, or the grooves 73 may be constructed larger, or spaced greater than illustrated, in order that the compartment 75 may contain different quantities of samples.

Figure 18:
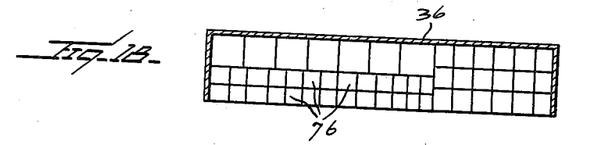
Figure 18 is a plan view of certain of the compartments or shelvings 36 for bottle goods.
Figure 19:
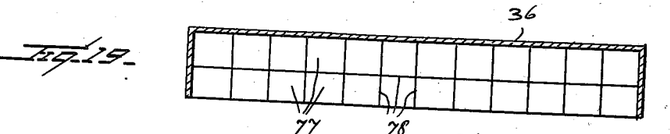
Figure 19 is a detail plan view of certain other of the shelvings 36 for bottle goods.
Figure 20:
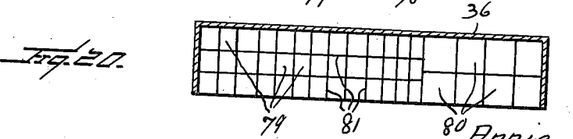
Figure 20 is a detail plan view of still other compartments or shelvings 36 for bottle goods of another class.
Figure 21:
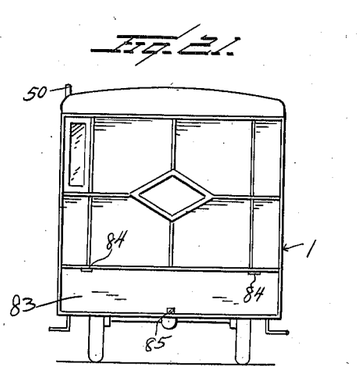
Figure 21 is a view in end elevation of the store.

In Figure 18 the wire bottle racks or compartments 36 are shown in plan view, and it will be noted that the bottles or the like are disposed vertically in the various smaller compartments or spaces 76. Another wire-rack or compartment 36 is shown in plan view of Figure 19, and this compartment is also divided into smaller spaces or compartments 77, by means of the partition 78. One of the compartments shown in Figure 4 and shown in plan view in Figure 20, and this compartment is subdivided into smaller spaces or compartments 79 and 80 by means of the partitions 81.

The under part or bottom of the body of the automobile grocery store upon the adjacent opposite side thereof is provided with a plurality of carriers or special compartments 82, for the reception of reserve stocks of goods. These compartments are provided with closures or shutters 83, which are hinged at 84 and provided with locks 85. Certain of the compartments at the bottom of the body of the automobile, may have tanks or containers (not shown), for the reception of oil and gasoline, especially adapted for sale to housewives and housekeepers.

The ceiling of the interior of the body of the automobile grocery store may be equipped with several electric lights (not shown), in order to be able to illuminate the interior of the body.

The suitable weighing scale (not shown) may be supported on one of the refrigerator counters, in order that the salesman may weigh the goods as it is bought. Also the refrigerator counter is designed to support a conventional form of cash register, so that the cash may be easily accounted for. The exterior of the body of the automobile grocery store may be decorated or designed in any suitable manner, as that indicated, in order to distinguish the present form of automobile grocery store from any other now in the field.

In using a device of this character, the salesman or chauffeur operates the entire system. For instance the store may be driven from place to place, and from one street to another, and when the customers or housewives are notified of the approach of the moving store, they may enter, and serve themselves with the various articles of food indicated on their list or memorandum, and when their baskets are filled, they may leave the store through another door, and are required to pay for their purchases as they leave. It has been found that by an apparatus of this kind the customer may be more conveniently and quickly served than by means of the movable store heretofore employed and disclosed in the aforesaid patent.

The invention having been set forth, what is claimed as being useful is:

1. In a portable grocery store, a housing having a salesman's aisle forwardly and centrally of the housing, a customer's aisle on one side of the salesman's aisle and having a gravity closed sliding entrance door to be opened from the exterior and unopenable from the interior, a customer's exit aisle on the opposite side of the salesman's aisle and having a gravity closed sliding exit door forwardly of the housing openable from the interior, and unopenable from the exterior, and a passage connecting the rear ends of the aisles.

2. In a portable grocery store, a housing having a central partition of shelving extending from the floor of the housing to the ceiling, a counter at one end thereof, a second counter adjacent one end of the first counter and at right angles thereto, a railing parallel to and extending forwardly from the first counter and at right angles thereto, a salesman's aisle between the railing and the second counter, entrance and exit customer's aisles on opposite sides of the central shelving, and a transverse aisle connecting the rear ends of the first aisles.

3. In a portable grocery store, a housing, an elongated shelving partition disposed longitudinally and centrally thereof and extending from the floor to the ceiling, entrance and exit aisles on opposite sides of the partition, a counter disposed transversely of the housing at the forward end of the partition, a salesman's aisle forward of said counter, a second counter at the end of the first counter and disposed at right angles thereto bounding one side of said salesman's aisle, a railing at right angles to the first counter at the end thereof bounding the opposite side of the salesman's aisle, the arrangement of the counters and the railing being such as to cause an open space to be formed over the counters and the railing and communicating with the forward ends of the entrance and exit aisles, whereby the customers are visible to each other as well as to the salesman.

In testimony whereof I hereunto affix my signature.

ANNIE L. MOSELEY.